US011067005B2

(12) United States Patent
Sheridan

(10) Patent No.: US 11,067,005 B2
(45) Date of Patent: *Jul. 20, 2021

(54) FAN DRIVE GEAR SYSTEM

(71) Applicant: RAYTHEON TECHNOLOGIES CORPORATION, Hartford, CT (US)

(72) Inventor: William G. Sheridan, Southington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 317 days.

This patent is subject to a terminal disclaimer.

(21) Appl. No.: 14/612,514

(22) Filed: Feb. 3, 2015

(65) Prior Publication Data

US 2016/0222888 A1 Aug. 4, 2016

(51) Int. Cl.
*F02C 7/36* (2006.01)
*F02K 3/06* (2006.01)
*F02C 3/107* (2006.01)
*F02C 7/06* (2006.01)

(52) U.S. Cl.
CPC .............. *F02C 7/36* (2013.01); *F02C 3/107* (2013.01); *F02C 7/06* (2013.01); *F02K 3/06* (2013.01); *F05D 2260/40311* (2013.01)

(58) Field of Classification Search
CPC .. F02C 3/107; F02C 3/073; F02C 7/06; F01D 3/006; F01D 9/041; F02K 3/04
See application file for complete search history.

(56) References Cited

U.S. PATENT DOCUMENTS

| 2,154,532 A | * | 4/1939 | Ryder | ................... B64D 35/04 |
| | | | | 475/332 |
| 2,583,872 A | * | 1/1952 | Newcomb | ............... F02C 3/107 |
| | | | | 416/170 R |
| 5,010,729 A | | 4/1991 | Adamson et al. | |
| 5,102,379 A | | 4/1992 | Pagluica et al. | |
| 5,389,048 A | | 2/1995 | Carlson | |
| 5,433,674 A | * | 7/1995 | Sheridan | ............... F16H 1/2809 |
| | | | | 475/346 |
| 5,466,198 A | | 11/1995 | McKibbin et al. | |
| 5,685,797 A | | 11/1997 | Barnsby et al. | |
| 6,223,616 B1 | * | 5/2001 | Sheridan | ............... F16H 1/2827 |
| | | | | 184/6.12 |
| 6,381,948 B1 | * | 5/2002 | Klingels | ................. F01D 25/16 |
| | | | | 416/129 |
| 6,964,155 B2 | | 11/2005 | McCune et al. | |

(Continued)

FOREIGN PATENT DOCUMENTS

| EP | 2915962 | 9/2015 |
| WO | 2014011245 | 1/2014 |

OTHER PUBLICATIONS

Jane's Aero-Engines, Edited by Bill Gunstron, Issue Seven, Mar. 2000. pp. 510-512.

(Continued)

*Primary Examiner* — Umashankar Venkatesan
(74) *Attorney, Agent, or Firm* — Carlson, Gaskey & Olds, P.C.

(57) ABSTRACT

A gas turbine engine includes a fan section and a star gear system for driving the fan section. A first fan section support bearing is mounted forward of the star gear system and a second fan section bearing is mounted aft of the star gear system.

10 Claims, 3 Drawing Sheets

(56) References Cited

U.S. PATENT DOCUMENTS

| | | | |
|---|---|---|---|
| 7,021,042 B2* | 4/2006 | Law | C23C 14/0623 |
| | | | 384/913 |
| 7,104,918 B2* | 9/2006 | Mitrovic | F02C 7/36 |
| | | | 475/331 |
| 7,726,113 B2* | 6/2010 | Orlando | F02C 3/107 |
| | | | 415/61 |
| 7,882,693 B2* | 2/2011 | Schilling | F02C 3/107 |
| | | | 60/204 |
| 8,191,352 B2 | 6/2012 | Schilling | |
| 8,261,527 B1 | 9/2012 | Stearns et al. | |
| 8,297,916 B1* | 10/2012 | McCune | F01D 25/164 |
| | | | 415/124.1 |
| 8,484,942 B1 | 7/2013 | McCune et al. | |
| 9,850,821 B2* | 12/2017 | Kupratis | F02C 7/36 |
| 2011/0206498 A1 | 8/2011 | McCooey | |
| 2013/0186058 A1 | 7/2013 | Sheridan et al. | |
| 2013/0224003 A1* | 8/2013 | Kupratis | F02K 3/072 |
| | | | 415/185 |
| 2014/0271135 A1 | 9/2014 | Sheridan et al. | |

OTHER PUBLICATIONS

Performance and Weight Estimates for an Advanced Open Rotor Engine, Eric S. Hendricks and Michael T. Tong, NASA/TM-2012-217710, AIAA-2012-3911, Sep. 2012, pp. 1-13.

Ciepluch et al., "Quiet, Powered-Lift Propulsion," NASA Conference Publication 2077, Nov. 14-15, 1978 (429 pages).

Civil Turbojet/Turbofan Specifications. Website: http://www.jet-engine.net/civtfspec.html.

Extended European Search Report for European Application No. 16154045.5 dated Jun. 28, 2016.

Technical Report. (1977). Quiet Clean Short-haul Experimental Engine (QCSEE) Under-the-Wing (UTW) final design report. NASA-CR-134847. Jun. 1, 1977. pp. 484-486.

Technical Report. (1975). Quiet Clean Short-haul Experimental Engine (QCSEE) UTW fan preliminary design. NASA-CR-134842. Feb. 1, 1975. pp. 96-97.

* cited by examiner

FAN DRIVE GEAR SYSTEM

BACKGROUND

Turbomachines, such as gas turbine engines, typically include a fan section, a turbine section, a compressor section, and a combustor section. Turbomachines may employ a geared architecture connecting the fan section and the turbine section. The compressor section typically includes at least a high-pressure compressor and a low-pressure compressor. The compressors include rotors that rotate separately from a rotor of fan. To maximize performance of such turbomachines, various recent engine architectures have been proposed in which the fan rotates in a first direction and at a first speed as compared to a low pressure compressor which rotates in the opposite direction and at a higher speed. These recent engine architectures can also be improved.

SUMMARY

In one exemplary embodiment, a gas turbine engine includes a fan section and a star gear system for driving the fan section. A first fan section support bearing is mounted forward of the star gear system and a second fan section bearing is mounted aft of the star gear system.

In a further embodiment of the above, the star gear system includes a sun gear that is in communication with a fan drive turbine and a ring gear that is in communication with the fan section.

In a further embodiment of any of the above, the sun gear is attached to the fan drive turbine with a flexible input shaft.

In a further embodiment of any of the above, the ring gear is attached to a fan drive shaft.

In a further embodiment of any of the above, a low pressure compressor is attached to the fan drive shaft.

In a further embodiment of any of the above, the ring gear is attached to the fan drive shaft with a flexible coupling.

In a further embodiment of any of the above, a carrier is mounted to a static structure to prevent the carrier from rotating.

In a further embodiment of any of the above, the carrier is mounted to the static structure with a flexible carrier support.

In a further embodiment of any of the above, a lubricant manifold is in fluid communication with the carrier.

In a further embodiment of any of the above, the star gear system includes a carrier that is attached to a static structure with a flexible carrier support. A ring gear is attached to a fan drive shaft with a flexible coupling. A sun gear is attached to an inner shaft with a flexible input shaft.

In a further embodiment of any of the above, there is a high pressure compressor with a compression ratio of approximately 20:1 or greater and a fan bypass ratio of approximately 10 or greater.

In another exemplary embodiment, a speed change mechanism for a gas turbine engine includes a star gear system which includes a carrier that has a flexible carrier support for attaching to a static structure of a gas turbine engine. There is a sun gear for attaching to a fan drive turbine and a ring gear that has a flexible coupling for attaching to a fan drive shaft.

In a further embodiment of any of the above, a lubricant manifold is in fluid communication with the carrier.

In a further embodiment of any of the above, the lubricant manifold is in fluid communication with a bearing on each of a plurality of star gears.

In a further embodiment of any of the above, the plurality of star gears and the ring gear each include a lubricant passage for directing lubricant radially outward.

In a further embodiment of any of the above, the lubricant passage on the ring gear is located axially between a first row of teeth and a second row of teeth on the ring gear.

In another exemplary embodiment, a method of assembling a speed change mechanism includes flexibly coupling a carrier to a static structure. The method also includes flexibly coupling a sun gear to a fan drive turbine and flexibly coupling a ring gear to a fan drive shaft.

In a further embodiment of any of the above, a manifold is attached to the carrier for directing a lubricant into the carrier.

In a further embodiment of any of the above, a fan section is supported on a first fan section support bearing located forward of the speed change mechanism.

In a further embodiment of any of the above, the fan section is supported on a second fan section support bearing located aft of the speed change mechanism.

DETAILED DESCRIPTION

Figure 1:
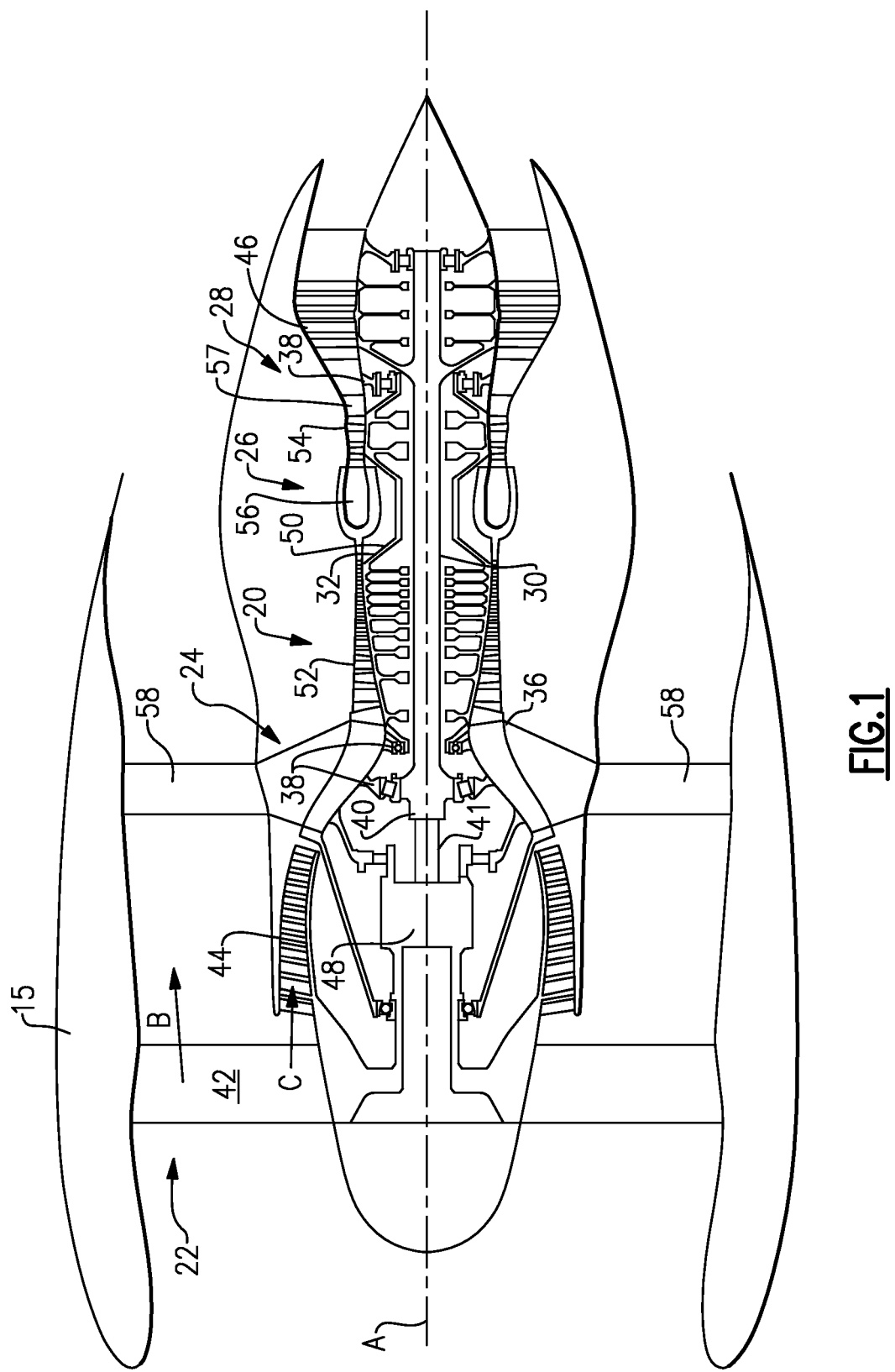
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42 through a flexible input shaft 41, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

As shown in FIG. 1, the low pressure compressor 44 is axially aligned with the geared architecture 48 so that fan exit guide vanes 58 are located further aft to reduce noise from the gas turbine engine 20.

Figure 2:
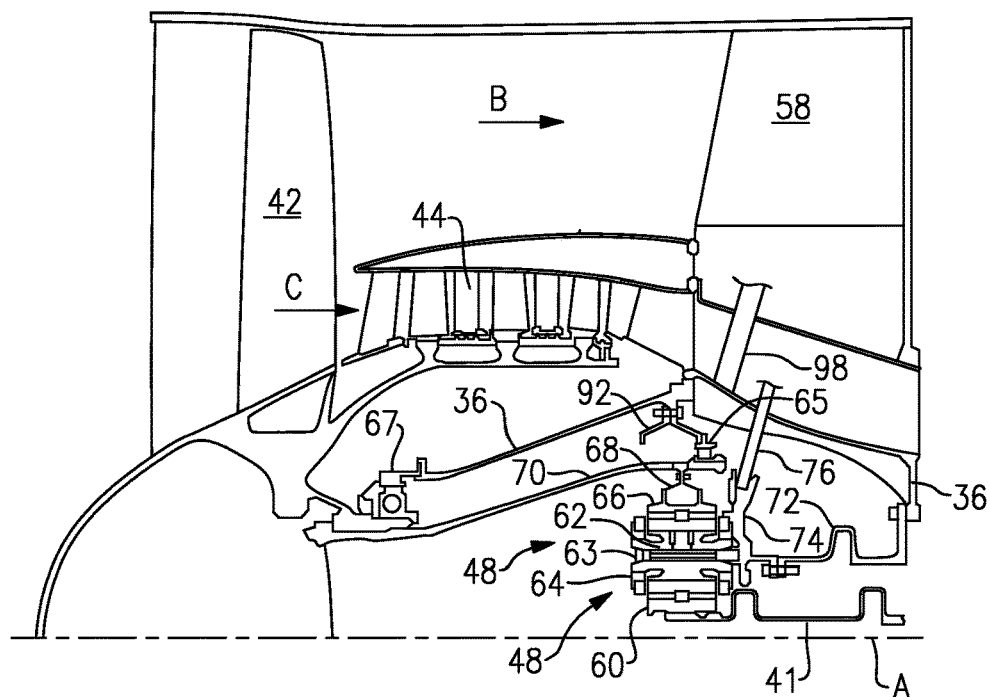
FIG. 2 is a sectional view of a forward section of the gas turbine engine of FIG. 1.

As shown in FIG. 2, the geared architecture 48 includes a sun gear 60 mounted to the flexible input shaft 41 which is attached to the inner shaft 40. Accordingly, the sun gear 60 is driven by the flexible input shaft 41. Surrounding the sun gear 60 is a plurality of star gears 62 supported on bearings 63 attached to a carrier 64. The star gears 62 are surrounded on a radially outward side by a ring gear 66 mounted to a fan drive shaft 70 with a flexible coupling 68. The flexible coupling 68 allows the geared architecture 48 to flex for proper alignment between the various elements of the geared architecture 48 during operation. The carrier 64 is attached to the engine static structure 36 through a flexible carrier support 72. The flexible input shaft, 41, the flexible coupling 68, and the flexible carrier support 72 work together to maintain alignment of the geared architecture 48 during operation of the gas turbine engine 20.

The geared architecture 48 connects to the fan drive shaft 70 axially forward of a fan shaft roller bearing 65 and axially rearward of a fan shaft thrust bearing 67 in order to allow the geared architecture 48 to be at least partially axially aligned with the low pressure compressor 44. Alternatively, the fan shaft roller bearings 65 could be located axially forward of the geared architecture 48 and the fan shaft thrust bearing 67 could be located axially aft of the geared architecture 48.

Figure 3:
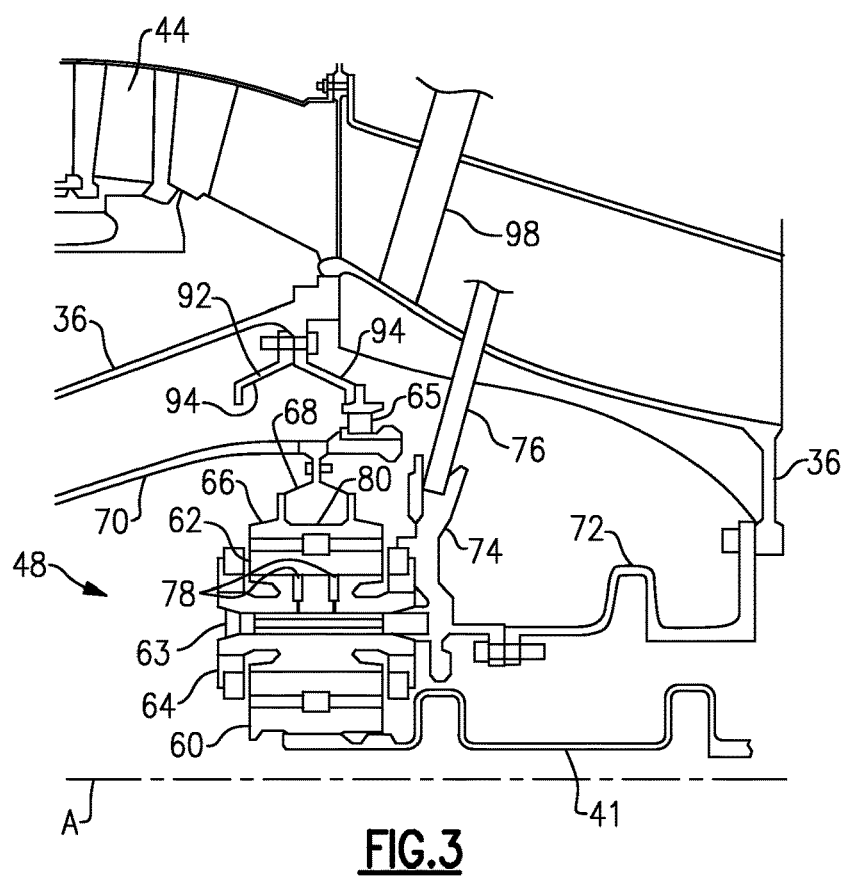
FIG. 3 is an enlarged sectional view of a speed change mechanism of the gas turbine engine of FIG. 1.
Figure 4:
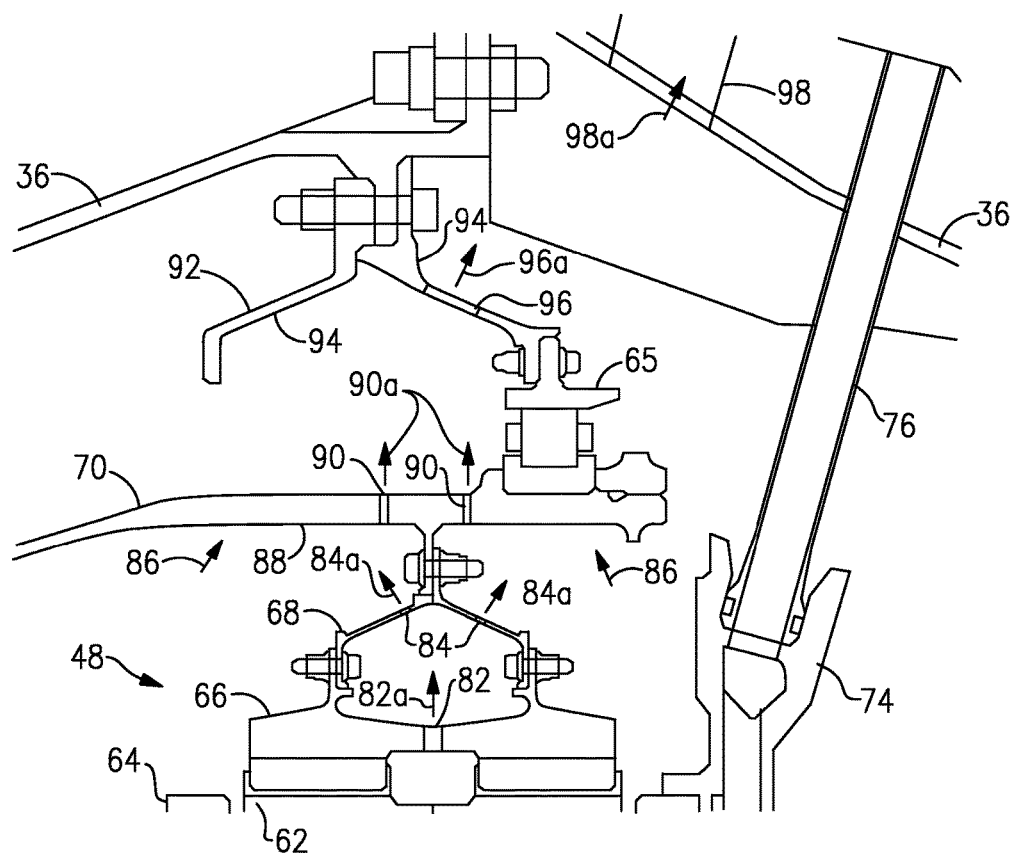
FIG. 4 is sectional view of the speed change mechanism of FIG. 3 showing a lubricant flow path.

As shown in FIGS. 2-4, the carrier 64 includes a lubricant supply manifold 74 attached to an axially downstream side of the carrier 64. The lubricant supply manifold 74 supplies lubricant, such as oil, to the carrier 64 and the remaining portions of the geared architecture 48. In the illustrated example, the lubricant supply manifold 74 is in fluid communication with the bearings 63 for the star gears 62. The star gears 62 include lubricant passages 78 to direct the lubricant from the bearings 63 radially outward to the interface between the star gears 62 and the ring gear 66 and radially inward to the interface between the star gears 62 and the sun gear 60.

As the lubricant travels radially outward and reaches the ring gear 66, the lubricant passes through a ring gear lubricant passage 82 as indicated by the arrow 82a. In the illustrated example, the ring gear 66 includes a forward half having a first set of teeth and an aft half including a second set of teeth and the ring gear lubricant passage 82 is located between the forward half and the aft half. From the ring gear 66, the lubricant then travels radially outward and collects on the flexible coupling 68. The lubricant then travels radially outward from the flexible coupling 68 through lubricant passages 84 in the flexible coupling 68 as indicated by arrows 84a.

The lubricant traveling from the flexible coupling 68 as indicated by the arrows 84a and other leakage lubricant from the geared architecture 48 as indicated by arrows 86 collects on a radially inner side 88 of the fan drive shaft 70. When the lubricant builds up on the radially inner side 88 of the fan drive shaft 70, the lubricant will travel radially outward through fan shaft lubricant passages 90 that extend through the fan drive shaft 70 as indicated by arrows 90a.

Once the lubricant passes through the fan shaft lubricant passages 90, the lubricant collects on a gutter 92. The gutter 92 is located radially outward from the fan drive shaft 70 and is at least partially axially aligned with the fan shaft lubricant passages 90. In the illustrated example, the gutter 92 includes two gutter halves 94 that form a V shape opening radially inward. However, the gutter 92 could also be formed from a single piece of material or have a curved shape. A gutter lubricant passage 96 is located in at least one of the two gutter halves 94 to allow the lubricant to travel radially outward through the gutter 92 as indicated by arrow 96a. In the illustrated example, the gutter lubricant passage 96 is located on a radially downstream gutter half 94. However, the gutter lubricant passage 96 could be located on a radially upstream gutter half 94.

Once the lubricant leaves the gutter 92 as indicated by the arrow 96a, the lubricant enters a sump 98 as indicated by an arrow 98a. The sump 98 collects the lubricant so that the lubricant can reused in the gas turbine engine 20.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising: a fan section; a star gear system for driving the fan section having a carrier mounted to a static structure to prevent the carrier from rotating; a first fan section support bearing supporting a fan drive shaft and mounted forward of the star gear system and a second fan section bearing supporting the fan drive shaft and mounted aft of the star gear system, wherein an outer race of the second fan section bearing is fixed relative to an engine static structure, wherein the star gear system includes a sun gear in communication with a fan drive turbine and a ring gear in communication with the fan section; and a low pressure compressor configured to rotate with the fan section to be driven by the fan drive shaft.

2. The gas turbine engine of claim 1, wherein the sun gear is attached to the fan drive turbine with a flexible input shaft.

3. The gas turbine engine of claim 1, wherein the ring gear is attached to the fan drive shaft.

4. The gas turbine engine of claim 3, wherein the ring gear is attached to the fan drive shaft with a flexible coupling.

5. The gas turbine engine of claim 1, wherein the carrier is mounted to the static structure with a flexible carrier support.

6. The gas turbine engine of claim 1, further comprising a lubricant manifold in fluid communication with the carrier.

7. The gas turbine engine of claim 1, wherein the carrier is attached to the static structure with a flexible carrier support, a ring gear is attached to the fan drive shaft with a flexible coupling, and a sun gear is attached to an inner shaft with a flexible input shaft.

8. The gas turbine engine of claim 1, further comprising a low pressure compressor having the downstream most row of blades entirely axially forward of the star gear system.

9. The gas turbine engine of claim 1, wherein the outer race of the second fan section bearing is at least partially attached to a gutter.

10. The gas turbine engine of claim 1, wherein the low pressure compressor is mechanically coupled to the fan section axially forward of the first fan section support bearing.

* * * * *